(12) United States Patent
Spincich et al.

(10) Patent No.: US 11,794,598 B2
(45) Date of Patent: Oct. 24, 2023

(54) ELECTRICAL INPUT CONNECTOR UNIT FOR CHARGING AN ELECTRIC VEHICLE OR HYBRID VEHICLE

(71) Applicant: TE Connectivity Italia Distribution S.r.l., Turin (IT)

(72) Inventors: Demis Spincich, Turin (IT); Alessandro Genta, Alpignano (IT)

(73) Assignee: TE Connectivity Italia Distribution S.r.l., Turin (IT)

( * ) Notice: Subject to any disclaimer, the term of this patent is extended or adjusted under 35 U.S.C. 154(b) by 659 days.

(21) Appl. No.: 16/450,073

(22) Filed: Jun. 24, 2019

(65) Prior Publication Data
US 2019/0389321 A1 Dec. 26, 2019

(30) Foreign Application Priority Data
Jun. 25, 2018 (IT) .......................... 102018000006615

(51) Int. Cl.
*B60L 53/18* (2019.01)
*B60L 53/30* (2019.01)

(52) U.S. Cl.
CPC ............ *B60L 53/18* (2019.02); *B60L 53/305* (2019.02)

(58) Field of Classification Search
CPC ................................ B60L 53/18; B60L 53/305
USPC ........................................................ 320/109
See application file for complete search history.

(56) References Cited

U.S. PATENT DOCUMENTS

| 5,385,480 | A | * | 1/1995 | Hoffman | B60R 16/02 439/138 |
| 5,757,595 | A | * | 5/1998 | Ozawa | B60L 58/12 340/455 |
| 7,553,198 | B1 | * | 6/2009 | Leddy | H01R 13/514 439/701 |
| 7,859,219 | B2 | * | 12/2010 | Harris | B60L 3/04 320/104 |
| 2011/0246014 | A1 | | 10/2011 | Sauper | |

(Continued)

FOREIGN PATENT DOCUMENTS

CN 201689995 U 12/2010
DE 102012004874 A1 9/2013

(Continued)

OTHER PUBLICATIONS

Search Report and Written Opinion, App. No. 201800006615, dated Mar. 1, 2019, 9 pages.

(Continued)

*Primary Examiner* — Suchin Parihar
(74) *Attorney, Agent, or Firm* — Barley Snyder (57) ABSTRACT

An electrical input connector unit for charging an electric vehicle or a hybrid vehicle comprises a connector body adapted to be mounted on a vehicle and having a central portion housing a plurality of electrical input contacts. The electrical input contacts are adapted to receive a plurality of corresponding contacts of a connector attached to a charging cable. The connector body has a socket opening out to a front side of the connector body and disposed adjacent to the central portion. The socket is configured to removably receive a human-machine interface module to control and/or provide information about a charging operation of the vehicle.

15 Claims, 8 Drawing Sheets

(56) References Cited

U.S. PATENT DOCUMENTS

| | | | | |
|---|---|---|---|---|
| 2012/0019206 | A1* | 1/2012 | Sekido | B60L 50/66 320/109 |
| 2012/0091958 | A1* | 4/2012 | Ichikawa | B60K 37/06 320/109 |
| 2012/0218779 | A1* | 8/2012 | Sawayanagi | H01R 13/7172 362/613 |
| 2013/0134937 | A1* | 5/2013 | Umeda | B60L 53/18 320/109 |
| 2014/0111144 | A1* | 4/2014 | Mo | B60L 53/16 320/107 |
| 2014/0127924 | A1* | 5/2014 | Kim | B60L 50/52 439/299 |
| 2015/0147905 | A1* | 5/2015 | Matsuda | B60L 53/18 439/490 |
| 2015/0183336 | A1* | 7/2015 | Kim | B60L 58/32 701/22 |
| 2016/0118744 | A1* | 4/2016 | Wittrock | H01R 13/5227 439/191 |
| 2017/0237205 | A1* | 8/2017 | Fuehrer | H01R 13/6683 439/620.22 |
| 2017/0259785 | A1* | 9/2017 | Lovett | E05B 83/34 |
| 2019/0047426 | A1* | 2/2019 | Effenberger | B60L 53/305 |
| 2019/0293493 | A1* | 9/2019 | Meissner | H05K 1/181 |
| 2019/0381905 | A1* | 12/2019 | Winkler | B60K 1/00 |
| 2020/0136287 | A1* | 4/2020 | Cormier | B60L 53/16 |
| 2020/0198485 | A1* | 6/2020 | Schwan | H01R 13/635 |
| 2021/0237608 | A1* | 8/2021 | Ghannam | B60L 53/18 |

FOREIGN PATENT DOCUMENTS

| | | |
|---|---|---|
| DE | 102016000311 A1 | 9/2016 |
| JP | H9285022 A | 10/1997 |
| JP | H1132110 A | 2/1999 |
| JP | 200787607 A | 4/2007 |
| JP | 2012105375 A | 5/2012 |
| JP | 201599764 A | 5/2015 |
| WO | 2012059804 A1 | 5/2012 |

OTHER PUBLICATIONS

Machine translated abstract of DE 10 2012 004 874, dated Sep. 12, 2013, 1 page.

Machine translated Abstract of DE 10 2016 000 311, dated Sep. 29, 2016, 1 page.

Examination Report from the Indian Patent Office dated Sep. 21, 2022, corresponding to Application No. 201944024797, 5 pages.

Office Action from Japan's Patent Office dated Jan. 31, 2023, corresponding to Application No. 2019-114185 with English translation, 8 pages.

* cited by examiner

Fig. 11

ELECTRICAL INPUT CONNECTOR UNIT FOR CHARGING AN ELECTRIC VEHICLE OR HYBRID VEHICLE

CROSS-REFERENCE TO RELATED APPLICATION

This application claims the benefit of the filing date under 35 U.S.C. § 119(a)-(d) of Italian Patent Application No. 102018000006615, filed on Jun. 25, 2018.

FIELD OF THE INVENTION

The present invention relates to an electrical input connector unit and, more particularly, to an electrical input connector unit for charging one or more batteries of an electric vehicle or a hybrid vehicle.

BACKGROUND

Electrical input connector units for charging electric vehicles or hybrid vehicles are associated with a human-machine interface (HMI) through which a user can control and/or receive information on the charging operation, for example, information on the state of charge of the vehicle's battery during the charging operation. Connector units of this type are described in DE 10 2016 000311 A1, JP 07087607 A, and DE 10 2012 004874 A1.

SUMMARY

An electrical input connector unit for charging an electric vehicle or a hybrid vehicle comprises a connector body adapted to be mounted on a vehicle and having a central portion housing a plurality of electrical input contacts. The electrical input contacts are adapted to receive a plurality of corresponding contacts of a connector attached to a charging cable. The connector body has a socket opening out to a front side of the connector body and disposed adjacent to the central portion. The socket is configured to removably receive a human-machine interface module to control and/or provide information about a charging operation of the vehicle.

BRIEF DESCRIPTION OF THE DRAWINGS

The invention will now be described by way of example with reference to the accompanying Figures, of which.

DETAILED DESCRIPTION OF THE EMBODIMENT(S)

Embodiments of the present invention will be described hereinafter in detail with reference to the attached drawings, wherein like reference numerals refer to like elements. The present invention may, however, be embodied in many different forms and should not be construed as being limited to the embodiments set forth herein; rather, these embodiments are provided so that the disclosure will convey the concept of the invention to those skilled in the art.

Figure 1:
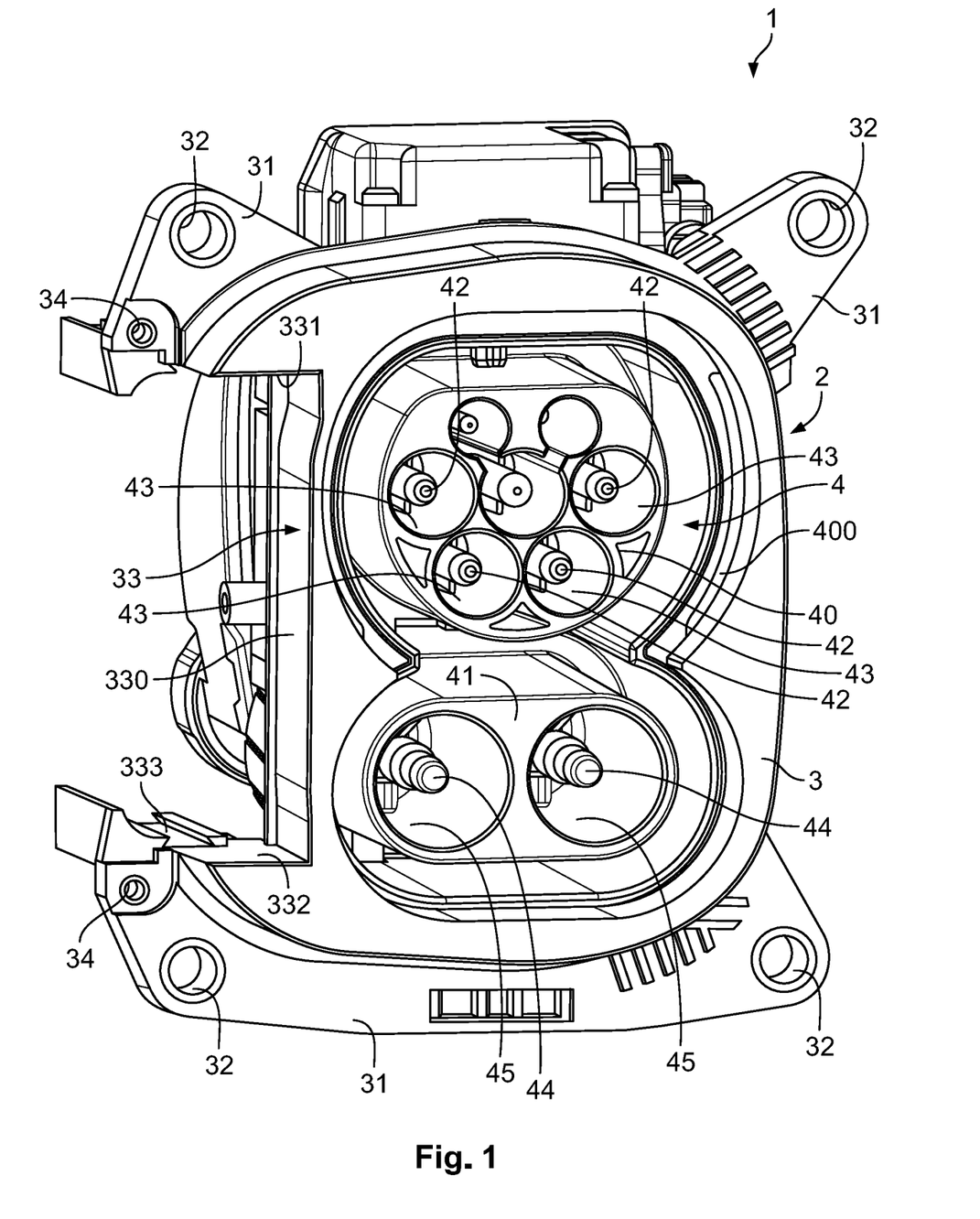
FIG. 1 is a perspective view of a connector unit according to an embodiment with an HMI module removed.
Figure 2:
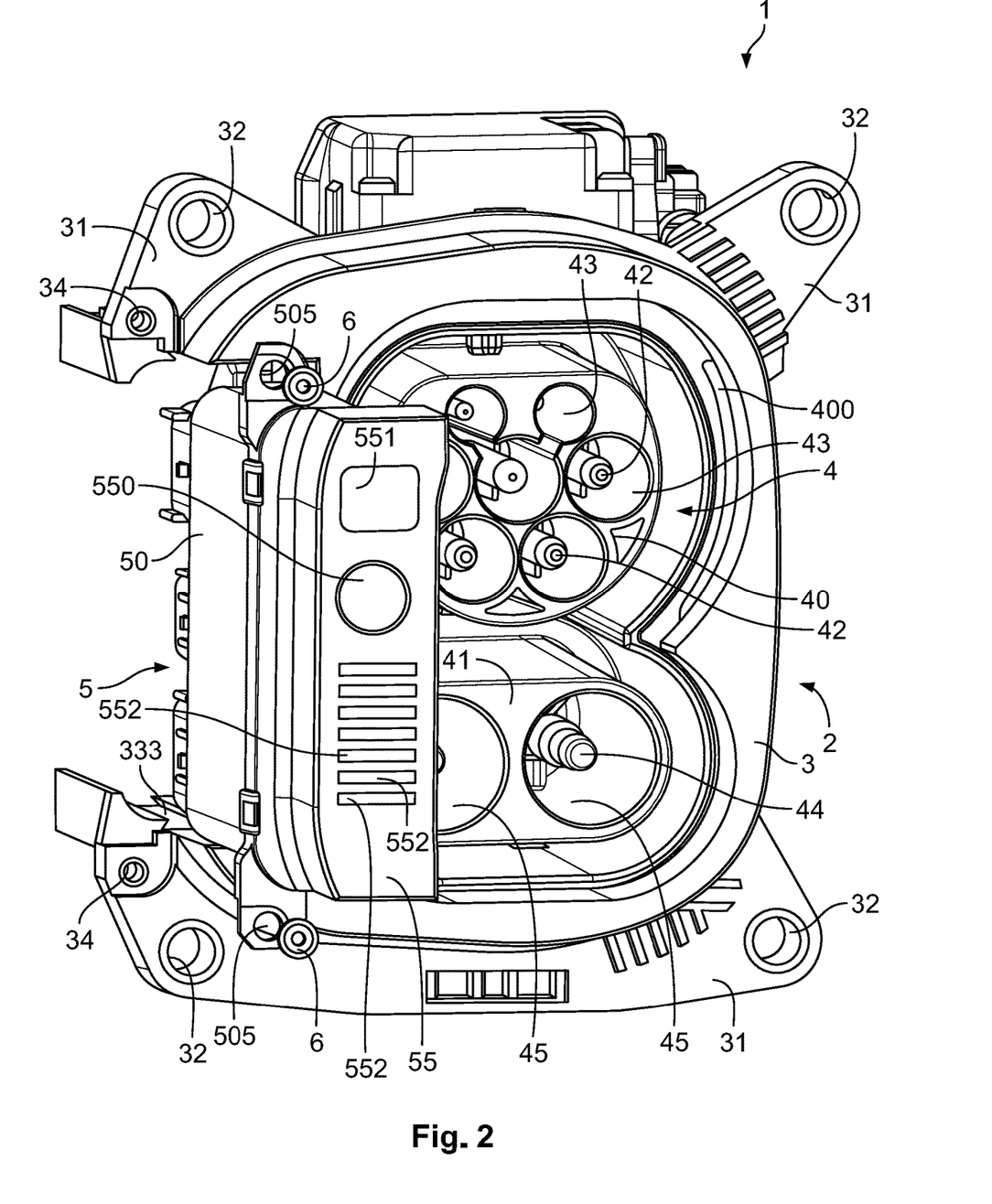
FIG. 2 is a perspective view of the connector unit of FIG. 1 at a stage of introducing the HMI module into a socket of the connector unit.
Figure 3:
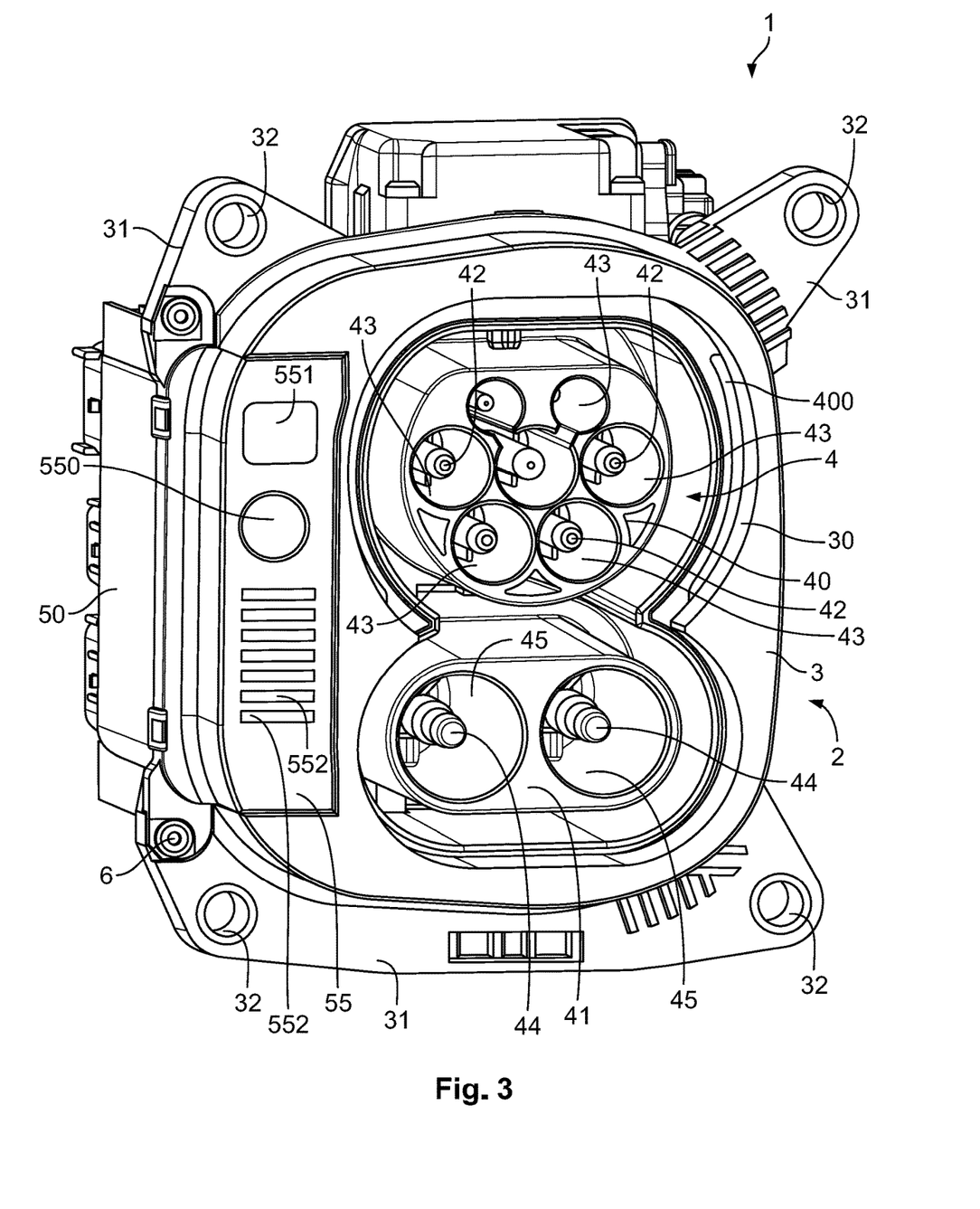
FIG. 3 is a perspective view of the connector unit of FIG. 1 with the HMI module mounted in the socket.

An input connector unit 1 according to an embodiment for charging a battery of an electric vehicle or hybrid vehicle is shown in FIGS. 1-3. The input connector unit 1 comprises a connector body made of plastic material, including a support casing 3 to which a central portion 4 bearing a plurality of electrical input contacts of the connector unit 1, intended to cooperate with the electrical contacts of a plug connector carried by or attached to a charging cable, is removably connected.

In this description, and in the attached drawings, construction details relating to the connection between the central portion 4 bearing the electrical input contacts and support casing 3 are not illustrated as they can be made in any known way. Also not illustrated, as they can be made in any known way, are the details of the individual electrical contacts and the way in which they are received and mounted within the central portion 4 of a connector body 2 of the connector unit 1.

The support casing 3 is frame-shaped and, as shown in FIGS. 1-3, has an opening 30 giving access to central portion 4. The connector unit 1 of the embodiment shown in FIGS. 1-3 has the central portion 4 including a combination of a first portion 40 bearing or housing electrical input contacts for alternating current charging and a second portion 41 housing electrical input contacts for direct current charging. The first portion 40 includes a plurality of first electrical input contacts 42 arranged within respective receptacles 43. The second portion 41 includes a plurality of second electrical input contacts 44 arranged within respective receptacles 45.

As shown in FIGS. 1-3, the support casing 3 has a pair of lights 400 arranged on either side of the central portion 4 and adapted to illuminate the area of the input contacts 42, 44. The support casing 3, which is part of the body 2 of the connector unit 1, also includes a plurality of flanges 31 in which holes 32 are formed to engage fixing screws to secure connector unit 1 to a supporting structure of a vehicle, in an embodiment, in a part accessible from an outside of the vehicle.

As shown in FIGS. 1-3, the support casing 3 defines a socket 33 for mounting a module 5 bearing a human-machine interface (HMI), also referred to as an HMI module 5. In the shown embodiment, the socket 33 is defined by a cavity formed by the body of casing 3, and disposed on one side of the casing 3, having a vertical and substantially flat back wall 330, an upper end wall 331, and a lower end wall 332. In the shown embodiment, the upper end wall 331 and the lower end wall 332 are substantially flat, parallel to each other, and substantially at right angles to the back wall 330. The socket 33 is exemplary and may be changed from the embodiment shown.

Figure 7:
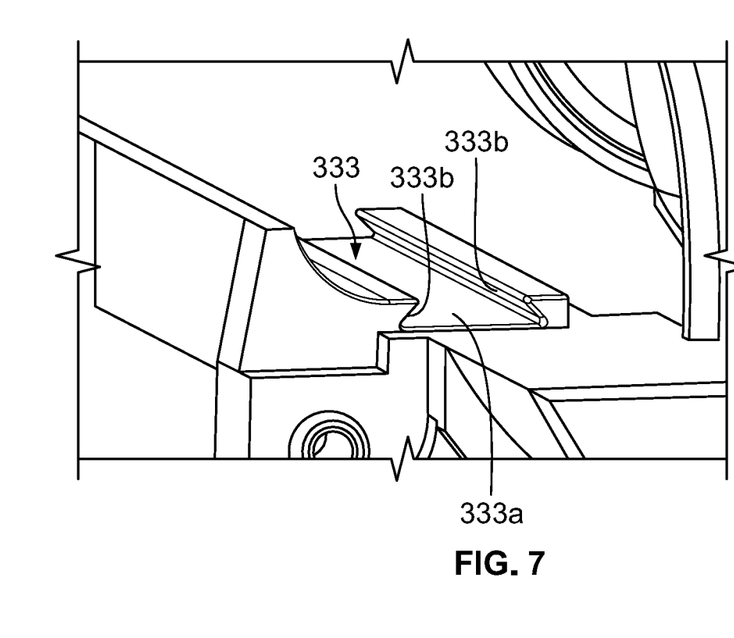
FIG. 7 is a detailed perspective view of a groove in a casing of the connector unit.

As shown in FIGS. 1, 2, and 7, adjacent to each of end walls 331 and 332, the body of support casing 3 defines a guide groove 333. The groove 333 guides a sliding fit of HMI module 5 into socket 33, as explained in greater detail below. As shown in FIG. 7, each guide groove 333 has a back surface 333a and two side surfaces 333b converging to define a dovetail profile with back surface 333a. In other embodiments, the shape of socket 33 and the arrangement of the guide grooves 333 described above may vary.

Figure 4:
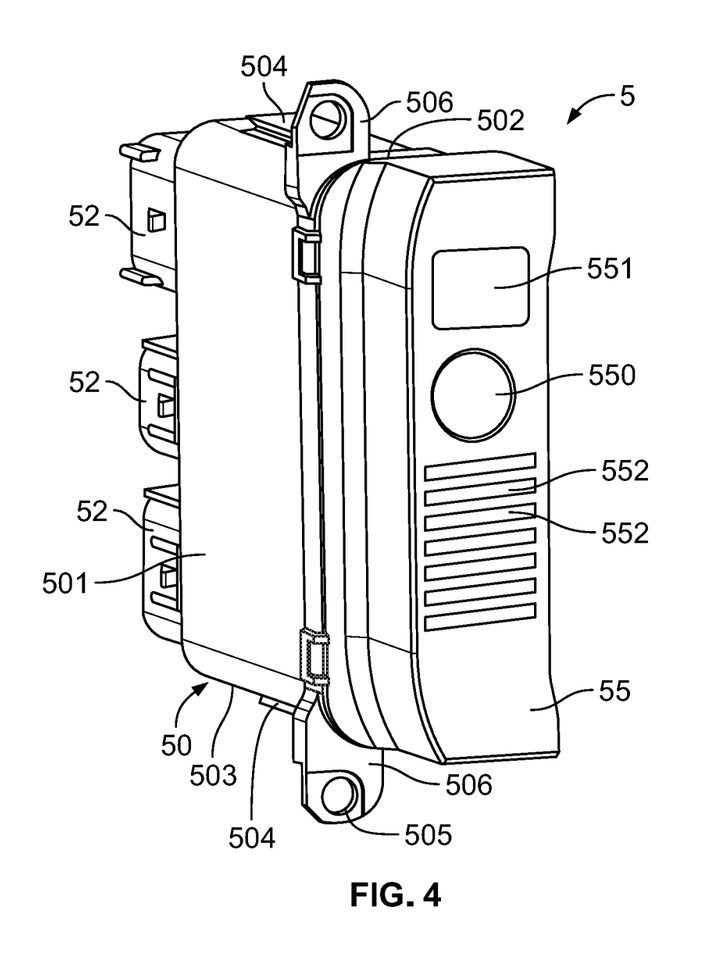
FIG. 4 is a front perspective view of the HMI module.
Figure 5:
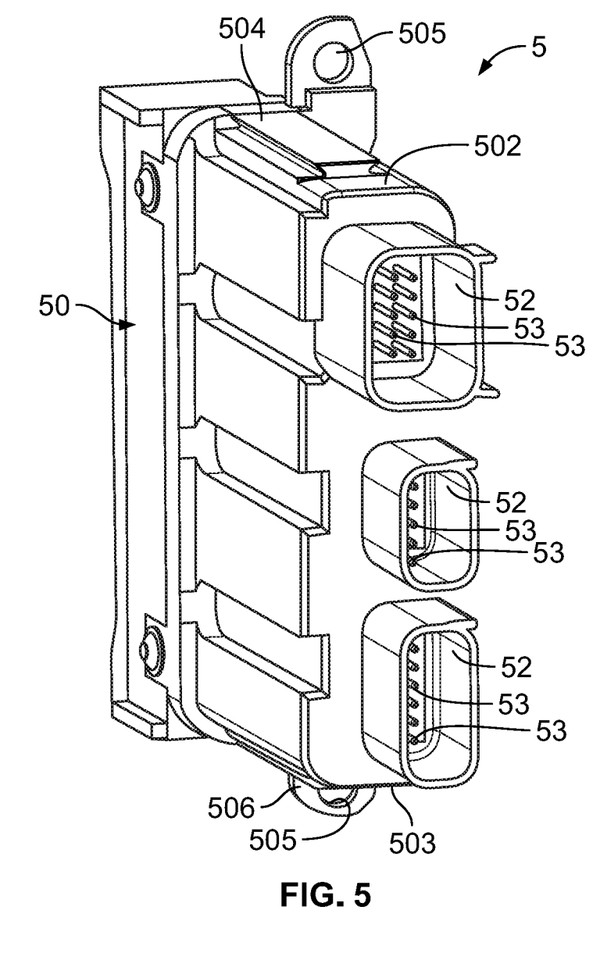
FIG. 5 is a rear perspective view of the HMI module.
Figure 8:
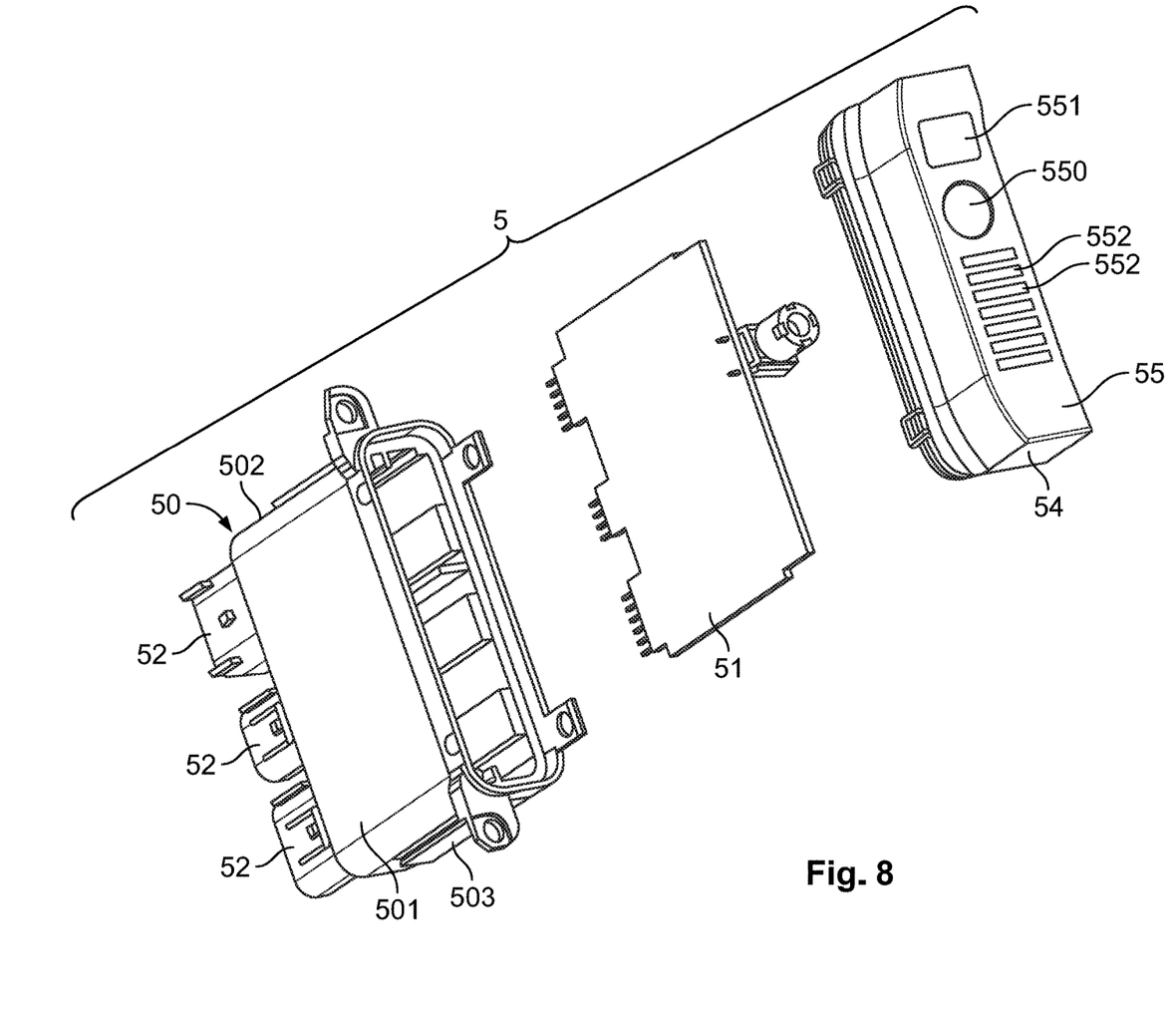
FIG. 8 is an exploded perspective view of the HMI module.
Figure 9:
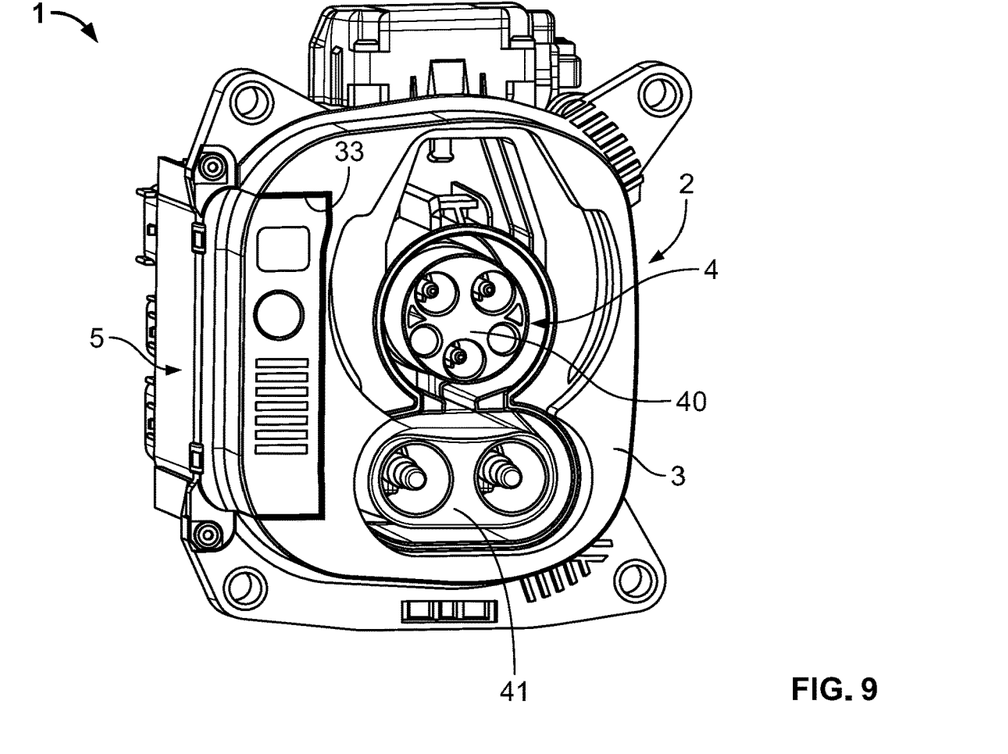
FIG. 9 is a perspective view of a connector unit according to another embodiment.

As shown in FIGS. 4, 5, and 8, the HMI module 5 includes a casing 50 made of plastic material inside which one or more printed circuit board (PCB) 51 electronic boards with an electronic control circuit are mounted. A rear end of HMI module 5 includes a plurality of electrical connectors 52 with electrical contacts 53 for connecting electronic board 51 to an on-board electronic controller of the vehicle. At a front end, the casing 50 of HMI module 5 is closed off by a support body 54 bearing an interface 55.

The interface 55, as shown in FIGS. 4 and 8, includes a button 550 with which it is possible, for example, to program a charging start time, a display 551, for example, to show an operating mode selected with the button 550, and a plurality of indicator lights 552 that light up progressively from bottom to top and then remain lit during charging to show the vehicle battery charge status. The embodiment of the interface 55 shown in FIG. 4 is merely exemplary; the HMI module 5 is configured so that different interfaces 55 can be manufactured according to the specific requirements of the vehicle manufacturer, thanks to the possibility of interchangeably substituting support body 54 bearing interface 55.

Figure 6:
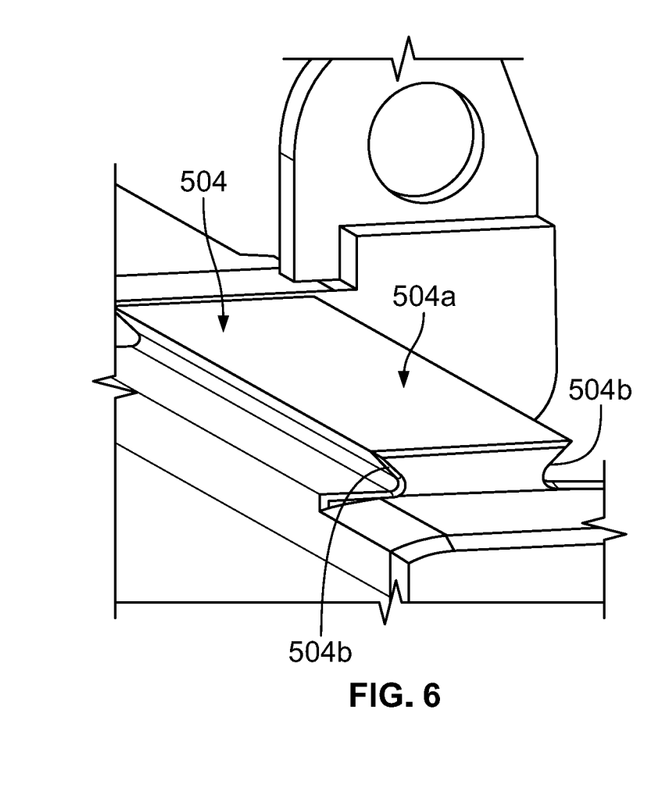
FIG. 6 is a detailed perspective view of a rib of a casing of the HMI module.

As shown in FIGS. 4 and 5, the casing 50 of HMI module 5 has a front side bearing the interface 55, a rear side bearing the connectors 52, two vertical side walls 501, an upper wall 502, and a lower wall 503. Both the upper wall 502 and the lower wall 503 are formed with a guide rib 504, shown in FIG. 6, designed to cooperate with a respective groove 333 in connector unit casing 3. As shown in FIG. 6, each rib 504 has a top surface 504a and two sides 504b diverging from each other to define a dovetail profile corresponding to that of the respective groove 333, shown in FIG. 7.

FIG. 3 shows the stage of mounting HMI module 5 into the socket 33 of casing 3 of connector unit 1; module 5 is inserted into socket 33 by sliding it in a direction at right angles to the front face of the connector unit 1, engaging ribs 504 within respective guide grooves 333. Once HMI module 5 has been positioned in its fully mounted condition inside socket 33 it is secured to casing 3 of connector unit 1 by screws 6 that engage through holes 505, shown in FIGS. 4 and 5, formed in flanges 506 of the casing 50 of HMI module 5, as well as in internally threaded bushes 34 borne by flanges 31 of support casing 3.

Figure 10:
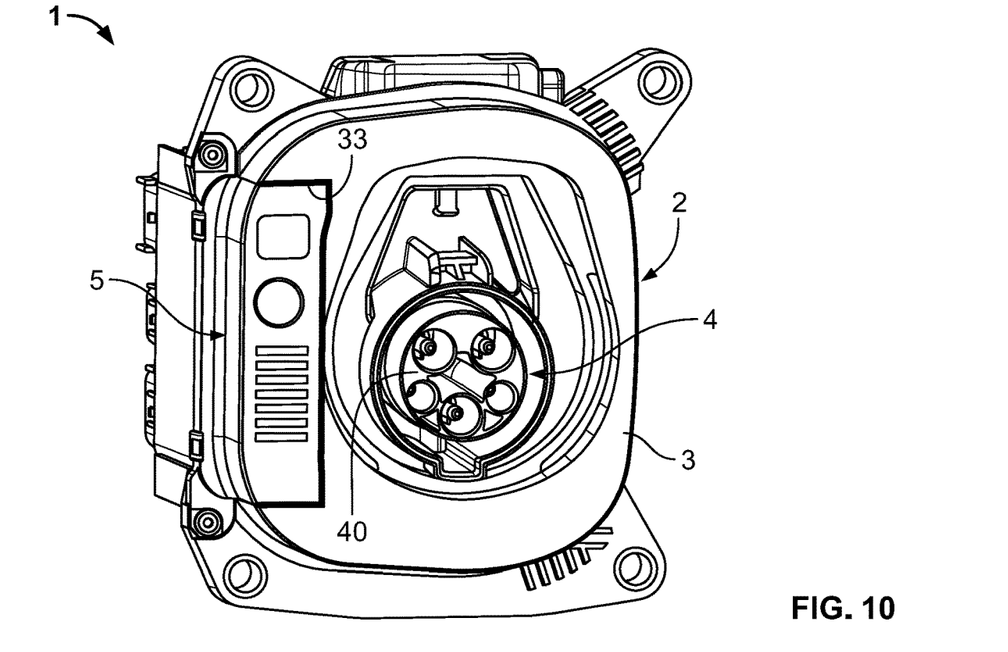
FIG. 10 is a perspective view of a connector unit according to another embodiment.
Figure 11:
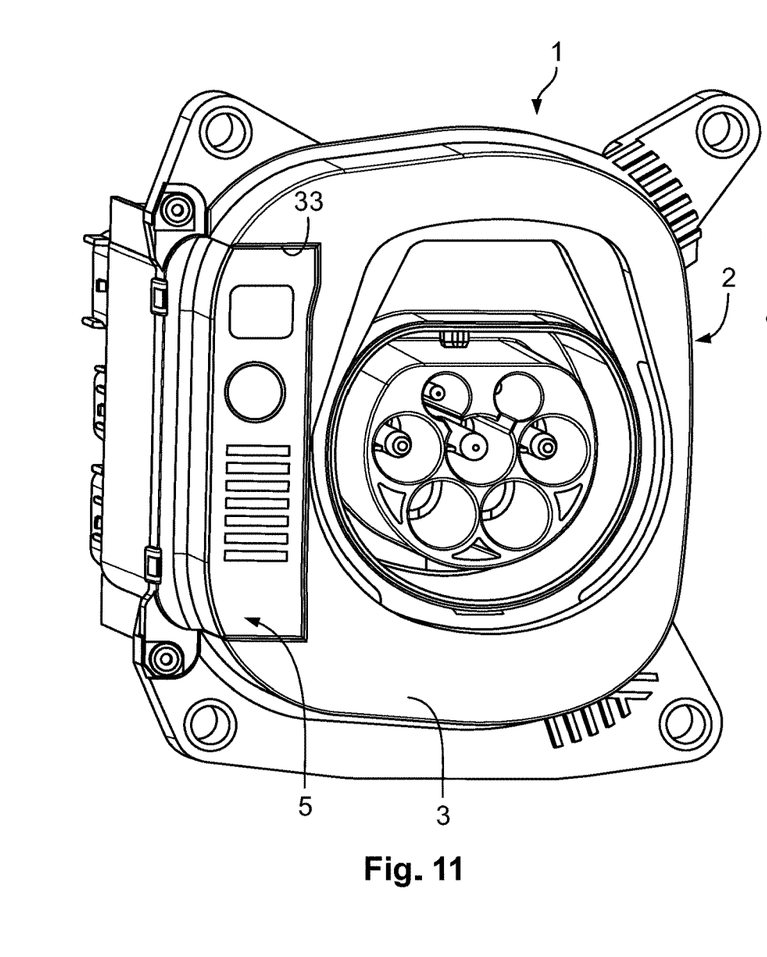
FIG. 11 is a perspective view of a connector unit according to another embodiment.
Figure 12:
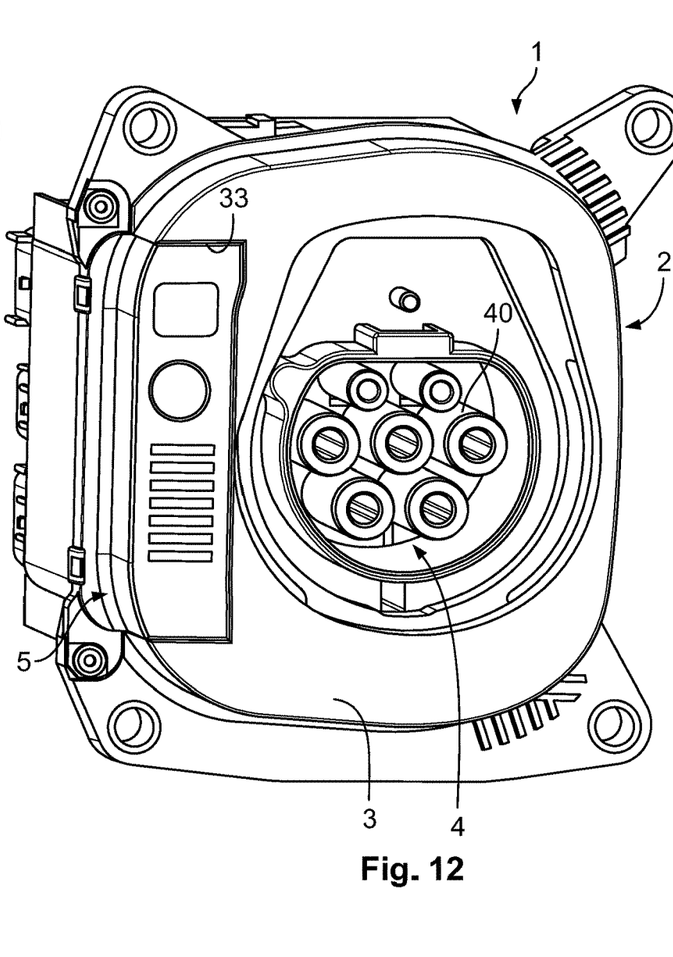
FIG. 12 is a perspective view of a connector unit according to another embodiment.

Input connector units 1 for charging one or more batteries of a hybrid vehicle or an electric vehicle according to various embodiments are shown in FIGS. 9-12. The input connector units 1 of FIG. 9-12 differ from the connector unit 1 shown in FIGS. 1-3 only in the configuration of the central portion 4, which can be either of the combined type including the first portion 40 for alternating current charging and the second portion 41 for direct current charging, as in FIG. 9, or of the type suitable only for alternating current charging with only the first portion 40, but with different contact configurations, as shown in FIGS. 10-12.

The different models of the connector unit 1 can be produced by changing only central portion 4, leaving unchanged the support casing 3 with the socket 33 ready to receive the HMI module 5. Having the modular construction that has been described above, HMI module 5 can easily and quickly be adapted with different interfaces, with different configurations of the electronic control circuit and with different connectors. It is also possible to produce a connector unit 1 without the HMI module 5, in which socket 33 remains empty.

The electrical input connector unit 1 has a relatively simple structure and low cost, and is designed on a modular basis to allow the connector unit 1 to easily configured with or without n HMI module 5, or with different interface characteristics, depending on the specific needs of each application, and to be mass produced at relatively low cost. The connector unit 1 can be fitted with the HMI module 5 and which can be assembled and installed simply and quickly.

What is claimed is:

1. An electrical input connector unit for charging an electric vehicle or a hybrid vehicle, comprising:
  a connector body adapted to be mounted on a vehicle and having a central portion housing a plurality of electrical input contacts, the electrical input contacts are adapted to receive a plurality of corresponding contacts of a connector attached to a charging cable, the connector body has a socket opening out to a front side of the connector body and disposed adjacent to the central portion, the socket is configured to removably receive a human-machine interface module to control and/or provide information about a charging operation of the vehicle, the connector body has a support casing that surrounds the central portion and separates the central portion from the socket, the socket is configured to receive the human-machine interface module through a sliding movement of the human-machine interface module into the socket, the human-machine interface module is mounted by sliding into the socket through mutual engagement of a guide rib of the human-machine interface module with a guide groove of the connector body.

2. The electrical input connector unit of claim 1, wherein the human-machine interface module includes a casing configured to be received within the socket.

3. The electrical input connector unit of claim 2, wherein the human-machine interface module includes an electronic control board mounted within the casing.

4. The electrical input connector unit of claim 3, wherein the human-machine interface module includes a support body bearing an interface and mounted at an end of the casing.

5. The electrical input connector unit of claim 1, wherein the support casing removably receives the central portion.

6. The electrical input connector unit of claim 5, wherein the socket is formed in the support casing.

7. The electrical input connector unit of claim 1, wherein the guide rib and the guide groove each have a dovetail profile.

8. The electrical input connector unit of claim 1, wherein the central portion receives the connector attached to the charging cable.

9. The electrical input connector unit of claim 8, wherein the socket is disposed spaced apart from the central portion on the connector body and does not receive the connector.

10. A process for manufacturing an electrical input connector unit for charging an electric vehicle or a hybrid vehicle, comprising:
  providing a connector body with a central portion housing a plurality of electrical input contacts, a socket opening out to a front side of the connector body, and a support casing that surrounds the central portion and separates the central portion from the socket;

providing a human-machine interface module, the human-machine interface includes a support body bearing an interface, the support body bearing the interface is chosen from a plurality of different models provided with different types of interfaces; and removably mounting the human-machine interface module in the socket.

11. The process of claim 10, wherein the human-machine interface module includes a casing configured to be received within the socket.

12. The process of claim 11, wherein the human-machine interface module includes an electronic control board mounted within the casing.

13. The process of claim 10, wherein the human-machine interface module is adapted to control and/or provide information about a charging operation of the vehicle.

14. The process of claim 13, wherein the central portion receives a connector having a plurality of corresponding contacts attached to a charging cable and connecting with the electrical input contacts.

15. The process of claim 14, wherein the socket is disposed spaced apart from the central portion on the connector body and does not receive the connector.

\* \* \* \* \*